United States Patent [19]

Kalnin et al.

[11] 4,238,658
[45] Dec. 9, 1980

[54] METHOD OF ASSEMBLY OF NONMAGNETIC CURRENT-CONDUCTING COMPONENTS

[76] Inventors: Robert K. Kalnin, ulitsa Gorkogo, 53, kv. 19; Benyamin A. Ioffe, ulitsa Stirnu, 37a, kv. 44; Jury A. Zommer, ulitsa Artileriyas, 52, kv. 25; Gunar Y. Sermons, ulitsa Bultu, 8, kv. 93; Ivan I. Kern, ulitsa Auglju, 4, kv. 1; Jury J. Kipers, ulitsa Kokles, 12, kv. 10, all of Riga, U.S.S.R.

[21] Appl. No.: 666,460

[22] Filed: Mar. 12, 1976

[51] Int. Cl.³ .............................................. B23K 13/00
[52] U.S. Cl. ..................................... 219/9.5; 29/447; 29/464; 29/744; 228/6 R; 228/212; 228/242; 335/219
[58] Field of Search .................. 219/6.5, 7.8, 8.5, 9.5, 219/10.41, 10.43, 10.73, 10.75, 85 A, 148, 149, 160; 336/DIG. 3, DIG. 4, 178; 29/428, 447, 464, 455 LM, 744, 810, 596; 228/180 A, 6 R, 212, 242; 335/219, 229, 250

[56] References Cited

U.S. PATENT DOCUMENTS

| 2,641,212 | 6/1953 | Meilstrup | 29/744 |
|---|---|---|---|
| 3,188,446 | 6/1965 | Ray et al. | 219/9.5 |
| 3,532,476 | 10/1970 | Peehs et al. | 29/447 |
| 3,636,486 | 1/1972 | Ioffe et al. | 29/744 |
| 3,651,439 | 3/1972 | Ioffe et al. | 335/219 |
| 3,754,313 | 8/1973 | McCulloch | 29/428 |
| 3,924,211 | 12/1975 | Ioffe et al. | 335/250 |
| 3,937,386 | 2/1976 | Hartleroad et al. | 228/180 A |

FOREIGN PATENT DOCUMENTS

| 241939 | 9/1969 | U.S.S.R. | |
| 405691 | 5/1974 | U.S.S.R. | 29/744 |

*Primary Examiner*—B. A. Reynolds
*Assistant Examiner*—Clifford C. Shaw
*Attorney, Agent, or Firm*—Lackenbach, Lilling & Siegel

[57] ABSTRACT

What is proposed is a method of assembling nonmagnetic current-conducting components into units along an axis of assembly. The assembly is arranged under the effect of electrodynamic forces formed by the interaction of a primary alternating magnetic field directed along the axis of assembly and a secondary magnetic field. The components to be assembled are placed in the primary magnetic field so that the areas covered by the contours of the currents induced in these components by the magnetic field are located in planes approximately perpendicular to the axis of assembly; and in each adjacent pair of components to be assembled the regions covered by the contours of the induced currents at least partially overlap each other.

18 Claims, 25 Drawing Figures

METHOD OF ASSEMBLY OF NONMAGNETIC CURRENT-CONDUCTING COMPONENTS

The present invention relates to methods of noncontact assembly of components under the effect of electrodynamic forces and, in particular, to a method of assembly of non-magnetic current conducting components. This method can be used for automation of assembly processes in instrument and machine-making industry.

Known in the prior art is a method of assembly of ferromagnetic components of the "shaft-sleeve" type under the action of electrodynamic forces. This method is based on the fact that one of the members being assembled is imparted complex rotary-translational motion with respect to the other component within the error of the initial setting of the component. The required coincidence of the axes of the components during assembly is obtained due to power interaction of one of the matched ferromagnetic components with a rotating magnetic field produced, for example, by a stator of a single phase electric motor. The component (shaft) arranged in the stator with a certain gap starts rotating in the direction opposite to the field motion. In this case, should the ends of the component be located asymmetrically relative to the stator faces, the component, in addition to the rolling motion about the stator, is subjected to a power action along its axis due to the fringe effect. By intentionally locating the component asymmetrically with respect to the direction in which it is to be assembled with the other component power action along the axis opposite to the other component being matched may be obtained. Such a method of assembly is described in the USSR Inventor's Certificate No. 241,939 as applied to assembly of ferromagnetic components.

This method, which requires definite location of one component with respect to the other, is effective only when the relative error of the initial mutual arrangement of the two components constitutes just a small fraction of the size of the matched parts of these components.

This method of assembly is based on probabilistic mechanical "detection" of the control projection or opening of one component with respect to the other component and is useless for accurate simultaneous arrangement of three and more components on a single axis of symmetry.

Also known in the art is a method of assembly of non-magnetic current-conducting components under the action of electrodynamic forces appearing due to the action of a primary alternating magnetic field and a secondary magnetic field. In this case, the induction and frequency of the primary magnetic field is selected sufficient for producing an electrodynamic force moving the component placed into this field. In particular, this method is used for laying the winding in a magnetic circuit of a stator or armature. The winding is preliminarily laid on a composite mandrel, its lower part located under the winding carrying a nonmagnetic current-conducting frame. The mandrel is made of a dielectric material. When the winding is connected to a source of current pulses, a current is induced in the frame under the action of the magnetic field of the winding (primary magnetic field). Due to the action of the magnetic field of this current (secondary magnetic field) with the winding magnetic field an electrodynamic force is produced, which pushes the winding from the frame into the stator gaps (U.S. Pat. Nos. 3,333,327 and No. 3,333,330).

The above method makes it possible to assemble units of two components only, one of the components (stator or armature) being passive, i.e. rigidly connected to the assembly position. In accordance with this method the second movable component (winding) is to be fed with electric current and this is difficult for quite a number of components. Furthermore, the movable component should be arranged on the axis of assembly as accurately as possible. All this limits the field of application of the known method.

An object of the invention is to develop a method of assembly of nonmagnetic current-conducting components, which makes it possible to carry out noncontact simultaneous arrangement of at least two components on a common axis (assembly axis).

Another object of the invention is to provide a method to carry out noncontact assembly of components even when the error in the initial position of the components constitutes 0.8–0.9 of the linear distance between the axes of the components to be joined.

These and other objects are attained by the method of assembly of nonmagnetic current-conducting components under the action of electrodynamic forces appearing due to the interaction of the primary alternating magnetic field whose frequency and induction are sufficient for producing an electrodynamic force moving the component placed into this field and a secondary magnetic field; the components are, according to the invention, placed in the primary magnetic field directed along the axis of assembly so that the areas covered by the currents induced in the components by this field and producing secondary magnetic fields are located in planes approximately perpendicular to the axis of assembly and, at least partially, overlap in each adjacent pair of the components to be joined.

To assemble complex-shape components, the primary magnetic field is preferably applied in pulses and an additional alternating pulsed magnetic field is applied to the assembly zone in the pauses of said primary magnetic field, the induction vector of said additional field being directed at an angle to the induction vector of the primary field and the pulse duration being equal to the pause duration of the primary magnetic field.

It is expedient that the angle between the induction vectors of the primary and additional magnetic fields be equal to 90°.

It is also expedient that the pulse duration in the primary and additional magnetic fields be gradually reduced from the first to the last stage of the process of assembly, while the pulse amplitude of the primary field is correspondingly increased.

The cross section of the primary magnetic field is preferably of the same shape as the maximum section of the components to be assembled in a plane perpendicular to the axis of assembly and to some extent exceeds this section.

As the components are joined, the cross section of the primary magnetic field should be narrowed until it coincides at the joint with the section of the components being assembled in the plane perpendicular to the axis of assembly.

In order to keep the components in the assembly zone, the primary alternating magnetic field may be made nonuniform in density, the peripheral zone of assembly having higher concentration of the magnetic flux.

The frequency of oscillation of the primary magnetic field should be selected by one of the members to be assembled featuring the maximum design frequency at a given value of the field induction.

To provide for optimum conditions of the process of assembly, the frequency of oscillations of the primary magnetic field should be gradually increased by 30–50% of the selected value while the components are being brought together to the moment of contact, this frequency being reduced to the selected value afterwards.

It is also desirable that, when the components contact each other by the surfaces to be joined, the induction of the primary magnetic field is doubled.

When assembling components of the "sleeve-shaft" type, the "sleeve" component is preferably placed first in the primary magnetic field and kept there until it acquires a temperature providing for an increase of the opening therein; then the "shaft" component is to be placed in the primary magnetic field.

On assembling units of at least three components, where the intermediate component is the brazing solder, the components are preferably heated by the primary magnetic field to the solder melting point.

The heating can be effected by increasing the frequency of oscillations of the primary alternating magnetic field.

The heating can also be effected by keeping the components in the primary magnetic field.

When the components are to be assembled on a mandrel, a ferromagnetic mandrel is preferably placed in the primary alternating magnetic field along the axis of assembly before placing the components in this field; the magnetic field is made nonuniform with the highest density at the axis of assembly.

The proposed method of assembly of nonmagnetic current-conducting components by means of an alternating magnetic field makes it possible to carry out simultaneous arrangement of at least two components along a common axis (axis of assembly) even if the error in the initial position of the components constitutes 0.8—0.9 of the linear distance between the axes of the components to be joined.

Accurate positioning and joining of the components along a common axis is performed without contact.

The method makes it possible to assemble both axisymmetrical and complex-shape components.

The method is also suitable for carrying out simultaneous assembly of components of different configuration on several axes, on a plane or on a casing.

The proposed method provides high accuracy of assembly and optimum operating conditions, for the components move in the assembly area along the shortest paths. The method can be carried out by means of simple and multipurpose devices.

The invention will now be described in greater detail with reference to a specific embodiment thereof, taken in conjunction with the accompanying drawings, wherein:

FIG. 1 is an isometric view of components to be assembled, placed in a magnetic field;

FIG. 2, FIG. 3, and FIG. 4 are cross-sectional views of the components of, FIG. 1 at different stages of the process of assembly;

The essence of the proposed method of assembly consists in that the members to be joined are placed in a primary alternating magnetic field, its induction vector being directed along the assembly axis (the axis with respect to which all joined components are centered). The components placed in the field are subjected to forces tending to set up the components along a single axis and to join these components thus providing for a complete assembly cycle.

The process of assembly is effected not due to probabilistic coincidence of the axes but due to interaction of the secondary magnetic field produced by the currents induced in the components by the primary magnetic field, the components being moved by the electrodynamic forces in the direction of the assembly axis along the shortest path.

The components should be arranged in the primary magnetic field so that the regions covered by the contours of the current induced therein are located in planes approximately perpendicular to the assembly axis and at least partially overlap in each adjacent pair of the components being assembled.

The induction and frequency of the primary magnetic field are selected so as to provide electrodynamic forces sufficient for moving any component to be assembled.

Figure 1:
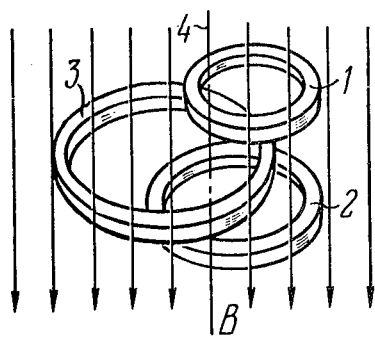

As an example of the components to be assembled, FIG. 1 shows isometrically three rings 1, 2, 3 having different diameters and placed in a primary alternating magnetic field B, its induction vector being directed along an axis 4 of assembly.

Figure 2:
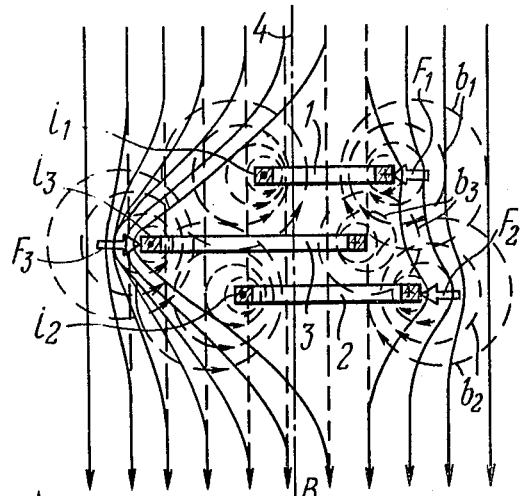
Figure 3:
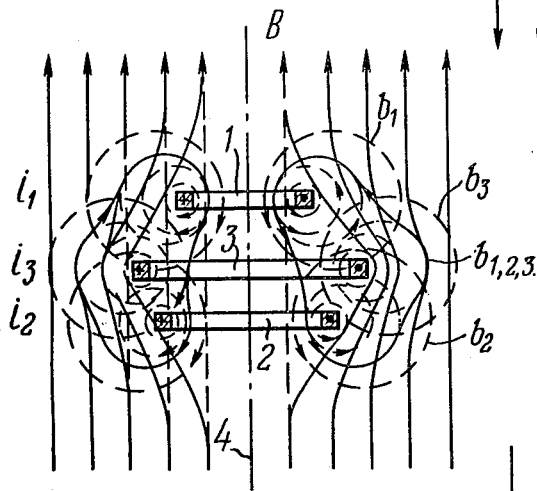

Referring to FIG. 2, the same rings 1, 2, 3 are shown in a cross-sectional view and the currents $i_1$, $i_2$, $i_3$ are induced in the rings 1, 2, 3 respectively under the effect of the magnetic field B. Due to the interaction of the magnetic field B with the secondary magnetic fields $b_1$, $b_2$, $b_3$ induced by the currents $i_1$, $i_2$, $i_3$, there appear electrodynamic forces $F_1$, $F_2$, $F_3$ which move the components along the axis 4 of assembly, i.e. the components are arranged coaxially. At the same time, due to the interaction of the magnetic fields caused by the currents $i_1$—$i_3$ the magnetic fluxes of these currents are "linked" and a common magnetic field $b_{1,2,3}$ covering simultaneously all the three rings 1, 2, 3 is produced (FIG. 3). The resulting electrodynamic forces move the components still closer to one an other (FIG. 4) and finally bring them together to a position, wherein the rings 1, 2, 3 are arranged concentrically with respect to the assembly axis 4.

Figure 4:
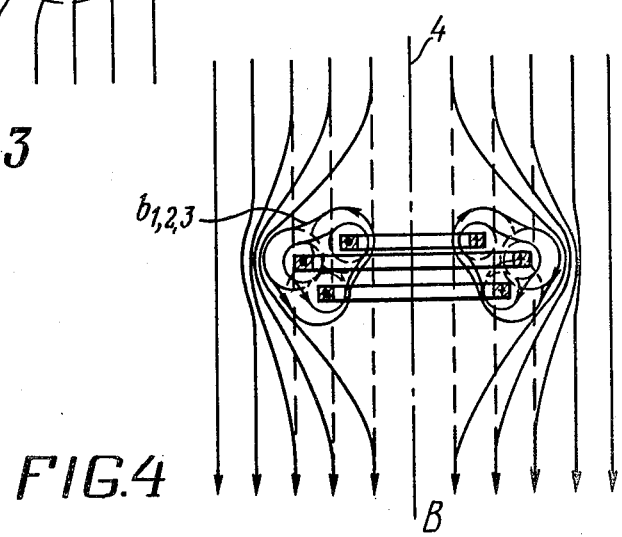

FIGS. 2-4 demonstrate that the assembly of components through the use of the proposed method is ensured if the induction vector of the primary magnetic field B is directed along the assembly axis 4 and the components (rings 1, 2, 3) are arranged in the assembly zone in such a position that the areas covered by the contours of the induced currents at least partially overlap and are located in planes approximately perpendicular to the axis of assembly.

Furthermore, FIGS. 2—4 demonstrate that a change in the direction of the induction vector of the magnetic field B results in a corresponding change in the direction of the induced currents but the resultant electrodynamic forces guiding the components to a common assembly axis 4 and connecting these components remain the same.

Figure 5:
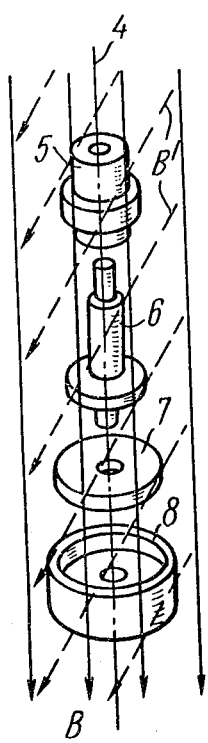
FIG. 5 is an isometric view of components to be assembled of a different shape.

FIG. 5 shows how the induction vector of the magnetic field B should be directed with respect to the assembly axis 4 of components 5, 6, 7, 8. It should be noted that the sleeve 5, the shaft 6, the washer 7, the cup 8 placed in such a field are subjected only to forces driving them to a common assembly axis 4 and providing their mutual connection. When the direction of the induction vector of the field does not coincide with the assembly axis 4, as shown by the dashed arrows in FIG. 5, the assembly process is disrupted because the contours of the currents induced in the components 5, 6, 7, 8 do not correspond to the surfaces being joined. What is more, with such a direction of the field the components 5, 6, 7, 8 are subjected to forces tending to turn each component in the direction of the magnetic field B' and this excludes coaxial assembly of the unit.

Thus, in order to provide effective assembly of the unit consisting of a great number of axisymmetric components, they must be supplied to the assembly zone so that their axes coincide with the assembly axis 4 and the induction vector of the primary alternating magnetic field B is directed along the assembly axis 4.

When assembling "sleeve-shaft" components with negative allowance or press fit by preheating the component encircling the joint, the heating is preferably effected directly in the assembly zone using the same alternating magnetic field B, for which purpose the "sleeve" component is moved to the assembly zone first, whereas the "shaft" component is driven to the assembly zone only after the "sleeve" component has acquired the temperature sufficient for obtaining a required joint. For example, if the components of FIG. 5 are to be joined so that the sleeve 5 is press fitted on the journal of the shaft 6 while the washer 7 is press fitted into the inner space of the cup 8, the components 5 and 8 are supplied first to the assembly zone, whereas the components 6, 7 are supplied to the respective gaps therebetween after the components 5, 8 have been heated to the required temperature.

A considerable positional error of two adjacent components to be joined is allowed. It is only required that the areas covered by the contours of the induced currents flowing through the joined surfaces overlap at least partially.

Figure 6:
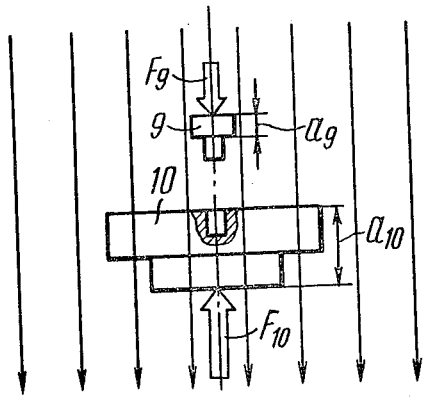
FIG. 6 is a side view of the components to be assembled and of the electromagnetic forces acting thereon.
Figure 7:
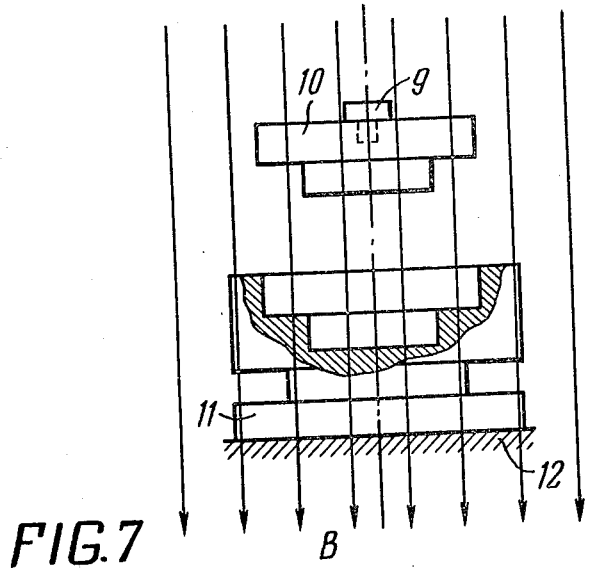
FIG. 7 is a side view of the components to be assembled, one of the components being rigidly connected to the assembly position.

The forces acting on the components being assembled can be calculated by means of well known techniques taking into account the required assembly conditions such as a plane in which the assembly process is effected (vertical, horizontal, etc.), the position of the components, i.e. without rigid coupling of components 9, 10 (FIG. 6) or one of components 11 (FIG.7) is rigidly connected to the assembly position 12. The mass, shape and size of some components are taken into account at a specified assembly rate. After determining the required conditions of assembly of the components, e.g. the forces $F_9$ and $F_{10}$ for the components 9 and 10 of FIG. 6, the optimum parameters of the primary alternating magnetic field B (frequency, induction) are calculated. The frequency f of oscillation of the magnetic field B is found from the generalized frequency $$\epsilon = 2T_1 f \delta \mu_o a^2 = \text{const},$$

where
f is the frequency of oscillation, Hz;
$\delta$ is the electrical conductivity of the component material, $\text{Ohm.m}^{-1}$;
$\mu_o$ is the vacuum magnetic permeability, $\text{Hm}^{-1}$;
a is the typical size of the component (plate thickness, cylinder radius, etc.), m.
$T_1$ is the time duration of the first stage of assemblywork, sufficient to coaxial arrangement of components.

Figure 8:
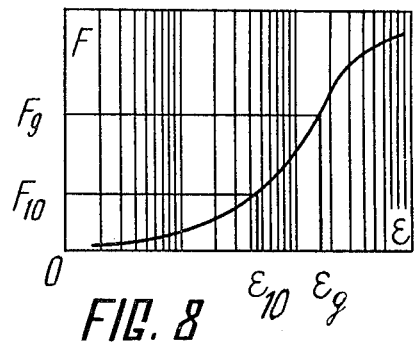
FIG. 8 shows a dependence of the electrodynamic forces on the generalized frequency of oscillations of the magnetic field.

The value of the generalized frequency $\epsilon$ is determined from a required value of the electrodynamic force in accordance with the graph $F = f(\epsilon)$ shown in FIG. 8. Assume that the electrodynamic forces $F_9$ and $F_{10}$ correspond to the generalized frequency values $E_9$ and $E_{10}$. Substituting the data or electrical conductivity ($\delta$) and size $a_9$ and $a_{10}$ of each separate component, the required frequency f of the magnetic field for each component to be assembled is determined.

The frequency of the primary magnetic field B in the assembly zone is set up for the component having the maximum value of required frequency. In this case in the process of assembly other components will be subjected respectively to a greater force and this accelerates the process of assembly.

Figure 9:
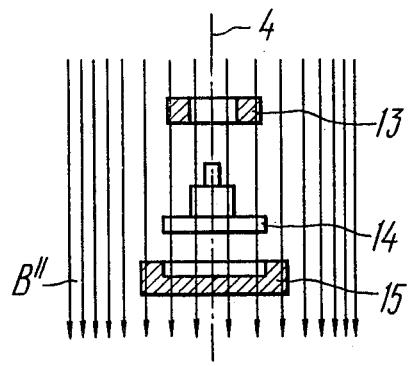
FIG. 9 shows an example of the assembly of components in a magnetic field having variable density.

The effect of noncontact retention of the components 13, 14, 15 near the assembly axis 4 is obtained by changing the density of the primary magnetic field B (FIG. 9) in the assembly zone so that it is increased in the direction from the axis 4 to the periphery of the assembly zone. This allows joining of different elements and units in the same assembly zone.

The electrodynamic forces acting on the components increase as the components draw closer together. These forces are proportional to the currents induced in the components, in their turn being proportional to the value of the primary magnetic field induction. Thus, varying the magnetic field induction, the force required for the assembly can be controlled.

Figure 10:
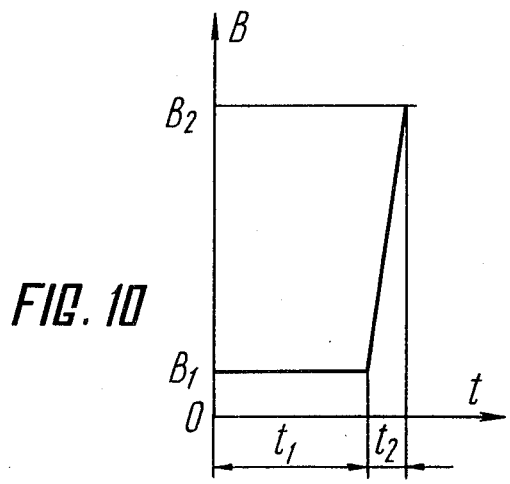
FIG. 10 illustrates a change in the induction of the magnetic field B with time.

The force sufficient for driving the components to the assembly axis and bringing them together is, as a rule, insufficient for their joining, e.g. for press fitting. In this connection, it is expedient to use the primary magnetic field induction in the process of assembly as shown in the graphical dependence B=f(t) of FIG. 10. In so doing the first step of the assembly should be effected at a value $B_1$ of the magnetic field induction sufficient for coaxial arrangement of the components during the time $t_1$, the final second step of joining the components during the time $t_2$ being conducted with a sharp increase of the magnetic field induction to a value $B_2$. After that the magnetic field is switched off.

On effecting the assembly of components according to the proposed method it has been found that, when one component partially enters another the external field is shielded by the larger component, the currents induced in the smaller component are reduced and, consequently, the force acting on the components being assembled is also reduced since this force is proportional to the current flowing through the components. In order to maintain the force acting on the components at a required level, the induction of the primary field may have to be increased.

However, the primary magnetic field induction cannot always be increased due to overheating of the assembled components and the design features of the magnetic systems. Furthermore, since the power consumed for the assembly is expressed as $P \approx B^2 f$, even a small increase in the induction results in considerable increase in the power, this being inexpedient from the viewpoint of power consumption.

The force action losses can be compensated in another way which does not require a change in the primary magnetic field induction.

For this purpose the initial (calculated) magnetic field frequency selected for the component, in which this frequency is maximum, is increased during the motion of the components towards each other by 30-50% at the moment of contact of the opposing surfaces; thereafter, as one component is entering the other, the field frequency is reduced to the calculated value.

The field frequency can be varied both continuously and stepwise.

For better understanding of the proposed invention let us consider a specific example.

Two aluminium rings were assembled. The outer diameter of the larger ring was equal to 20 mm, the height was 5 mm; the outer diameter of the smaller ring was equal to 14 mm, the height was 5 mm. The rings were placed in the magnetic field $B=0.2$ T directed along the axis of assembly coinciding with the axis of symmetry of the rings. With the axial distance between the rings equal to 1.5 mm the field frequency f of 10 kHz was supplied. As the rings approached each other up to the point of contact, the frequency f was continuously increased to 15 kHz; then, as one ring entered the other, the field frequency was reduced to f=2 kHz when the smaller ring entered the larger one for a depth of 2.5 mm.

An increase of the electrodynamic force amounted to 70% as compared with the assembly of similar rings in the magnetic field $B=0.2$ T and f=const=10 kHz.

Soldered connections are widely used in the electrotechnical industry and in radio engineering. The process of assembly of such connections has lately become very efficient due to the fact that brazing solder is made in the form of a complete component shaped as a washer, ring or cap. The process of assembly of such connections is over when the completed unit is fed into a tunnel furnace. In this case, the proposed method is advantageous in that after the components have been completed on the axis of assembly by a magnetic field, the same field is used for heating the members to the melting point of the solder, thus completing the process of assembly.

The components are heated to the melting point of the solder either by means of a short-term increase in the frequency of oscillation of the primary magnetic field or by keeping the components in the primary magnetic field.

Figure 11:
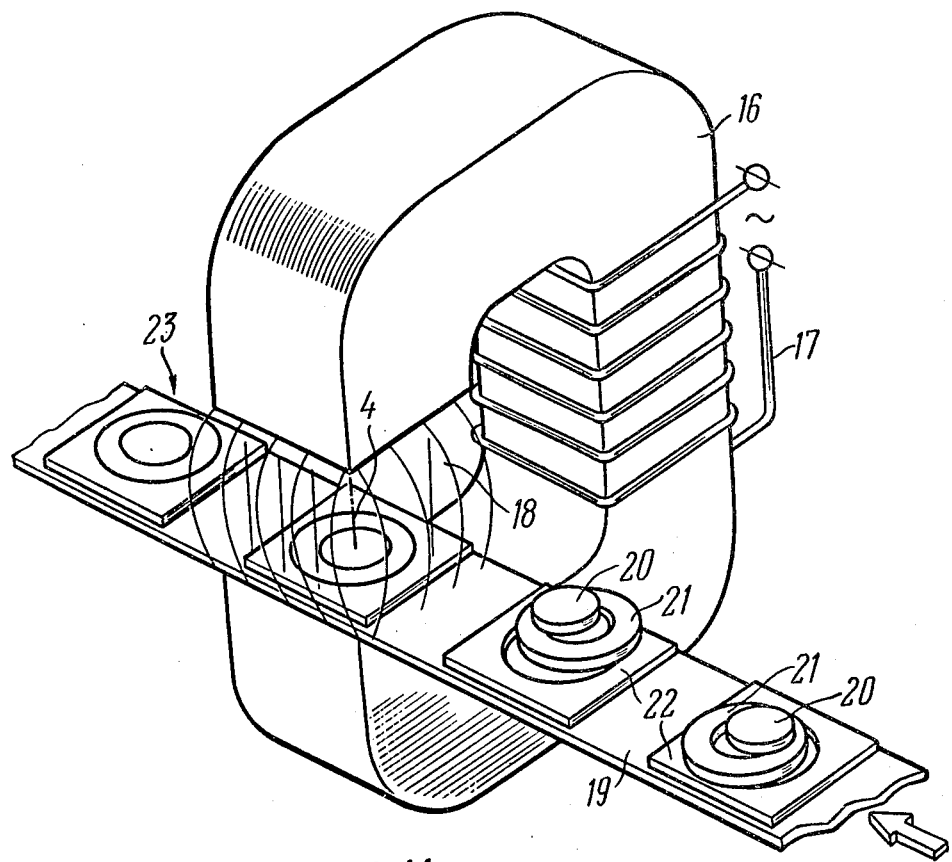
FIG. 11 is an isometric view of the device for assembly of axisymmetric components.

An embodiment of the device for assembly of axisymmetric components according to the proposed method is shown in FIG. 11. The device consists of a C-shaped electric magnet 16, its winding 17 being connected to an a-c current source (not shown). The assembly zone 18 is in the interpole space of the electric magnet 16. The device is shown with a set of components 20, 21, 22 transported to the zone 18 by a conveyer 19 and a ready unit 23 transported from the assembly zone 18 by the same conveyer 19.

The device operates as follows. The conveyer 19 feeds sets of components 20-22 to be assembled to the assembly zone 18. At the same time, the winding 17 of the electric magnet 16 is connected to the current source so that a primary magnetic field originating in the assembly zone 18 induces electric currents in the components 20-22. These currents induce secondary magnetic fields interacting with the primary magnetic field. In this case, there appear electrodynamic forces which move the components 20-22 to the common assembly axis 4 and ensure their coincidence by the joining surfaces as it was described earlier referring to FIGS. 2 to 4. The ready unit 23 consisting of the components 20-22 is removed from the assembly zone 18 by the conveyer 19.

The given device also ensures simultaneous assembly of several units. In this case, the conveyer 19 simultaneously feeds several sets of components to the assembly zone. In this case it is expedient to provide nonuniform density of the primary magnetic field (for example, by changing the shape of the pole pieces of the electric magnet 16) with maximum density of the field being at the periphery of the assembly zone 18 to keep the components to be assembled within the assembly zone 18.

When it is necessary to assemble components of a more complex shape into units, the primary magnetic field is fed in pulses and during the pauses between the pulses of the primary magnetic field the assembly zone is acted on by an additional pulsed alternating magnetic field, its induction vector being directed at an angle to the induction vector of the primary field and the pulses being equal to the pauses of the primary magnetic field.

Under such an action of the primary and additional magnetic field the components acted on by the primary field approach each other and tend to rotate about the joint axis, while the additional field produces forces forcing the components apart so that during repeated application of the primary field one component is again free for approaching the other component and both can rotate about their common axis.

Periodic application of the primary and additional magnetic fields to the assembly zone provides for quick and reliable coincidence of the surfaces being joined. In this case the assembly is effected due to the motion of the components towards each other along the shortest path.

Figure 12:
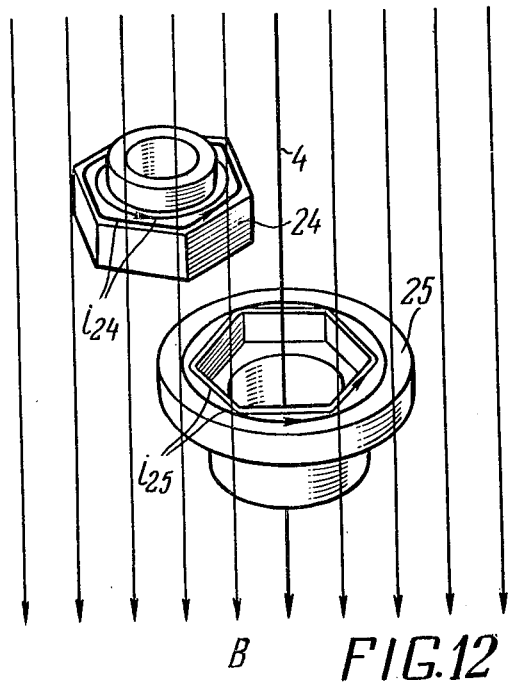
FIG. 12 shows complex-shaped components being assembled.

Let us consider in detail the essence of the proposed method of assembly by way of an example of joining two components 24 and 25 (FIG. 12).

It is evident that coaxial arrangement of such components is not enough for their assembly.

The hexahedral projection of the component 24 enters the corresponding hexahedral socket of the component 25 only if their axes of symmetry and the direction of their edges coincide.

The required coaxial coincidence of the components along the assembly axis 4 (FIG. 12) is ensured by the components preliminarily transferred to the assembly zone are acted on by the primary magnetic field B, its induction vector being directed along the assembly axis 4. The components are arranged in this zone in such a way that after the magnetic field B is applied, the contours of the induced currents $i_{24}$ and $i_{25}$ of the adjacent assembled components overlap at least partially, and in the section perpendicular to the assembly axis they correspond to their surfaces being joined. It is well known that in this case the resulting electrodynamic forces move the components in the direction of the assembly axis 4. Furthermore, the components placed into such a field approach each other under the action of the induced currents.

Figure 13:
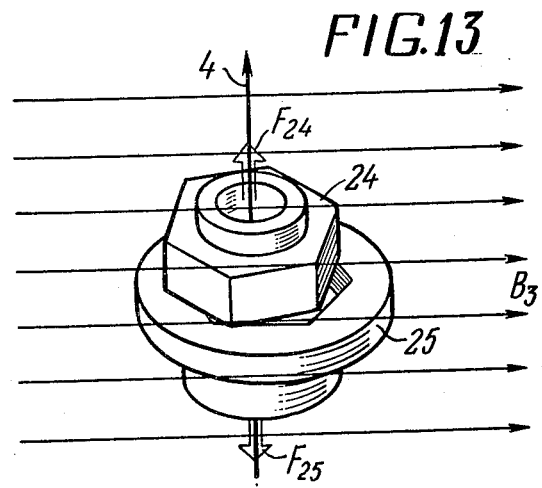
FIG. 13 shows the same component during the assembly.

However, when the edges of the joined components do not coincide, as in FIG. 13, further process of assembly in the magnetic field by directing the induction vector along the axis 4 is very difficult. This is explained by the fact that, although the contours of the induced currents $i_{24}$ and $i_{25}$ tend to be coincident in configuration (hexahedron with hexahedron), the process of matching the contours (edges) takes comparatively long time (30-90 s) due to the fact that the components are pressed together under the action of the electrodynamic forces. The components, after they are placed in this alternating magnetic field and contact each other, are imparted vibratory and microrotary motions which finally result in assembly of the complex-shape components.

In order to accelerate the process of assembly of such components, the primary magnetic field B is fed to the assembly zone in pulses. The duration of the first pulse of the primary alternating magnetic field B is selected such that the components to be assembled can be driven to the assembly axis 4 from their worst possible initial position and contact each other. Then this field is switched off and the components are acted on by the additional alternating magnetic field $B_3$ directed preferably perpendicular to the assembly axis 4. In this case, as shown in FIG. 13, the components acted on by the induced currents $i_{24}$ and $i_{25}$ are subjected to the electrodynamic action (forces $F_{24}$ and $F_{25}$). Due to the action of such forces the components are repelled one from another.

The time of action of the additional magnetic field pulse (the pause duration of the primary field) is selected so that the distance between the components is not in excess of 1-2 mm. Then, the primary magnetic field pulse is again applied to the components being assembled. After that, this pulse is removed and the additional magnetic field is applied, etc. In this case the components can freely rotate and be closed in a required position.

It should be noted that the components acted on by the electrodynamic forces are joined through the shortest path.

Figure 14:
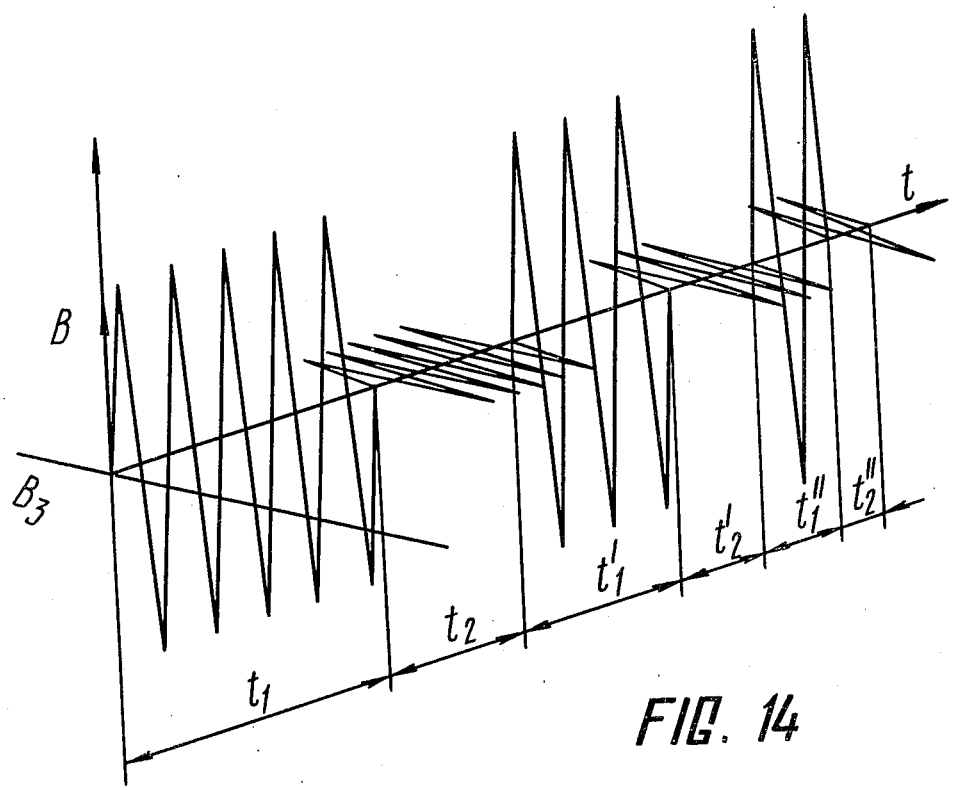
FIG. 14 shows variations of the duration of pulses and amplitudes of the primary and secondary magnetic fields with time.

The efficiency of the assembly can be improved by changing the duration of the pulses and pauses of the primary magnetic field (hence of the additional field) in the process of assembly so that the amplitude of each subsequent pulse of the primary magnetic field B increases and the duration ($t_1$, $t_1'$ . . . ) decreases while each subsequent pulse of the additional magnetic field $B_3$ also decreases in its duration ($t_2$, $t_2'$). This is illustrated graphically in FIG. 14, where $t_1 > t_1' > t_1''$, etc. and respectively $t_2 > t_2' > t_2''$, etc.

In this case the induction amplitude of the additional magnetic field $B_3$ may be kept constant. The frequency of oscillations of the magnetic field B is selected taking into consideration the electrical conductivity $\delta$ of the material of the components and their typical size "a" (this was discussed above in greater detail). Taking into account that the typical size "a" of the same component in the direction of the field B differs from that in the direction of the field $B_3$, the frequency of the primary magnetic field can respectively differ from the frequency of the additional magnetic field. None the less, in some practical cases it is expedient to produce primary and additional magnetic fields of the same frequency to simplify the supply system of the magnetic circuit. It is expedient to select the highest frequency of the two. Ultimately, this not only simplifies the magnetic system but also improves the efficiency of the process of assembly. The total cycle of action of the pulses of the two magnetic fields is selected to provide a required assembly time. This cycle is determined taking into account the worst possible initial position of the components and the requirement of their reliable connection. The tests conducted have confirmed the efficiency of the proposed method of assembly. The duration of the cycle of assembly of the components 24 and 25 shown in FIG. 12 amounted to about 1 second.

Figure 15:
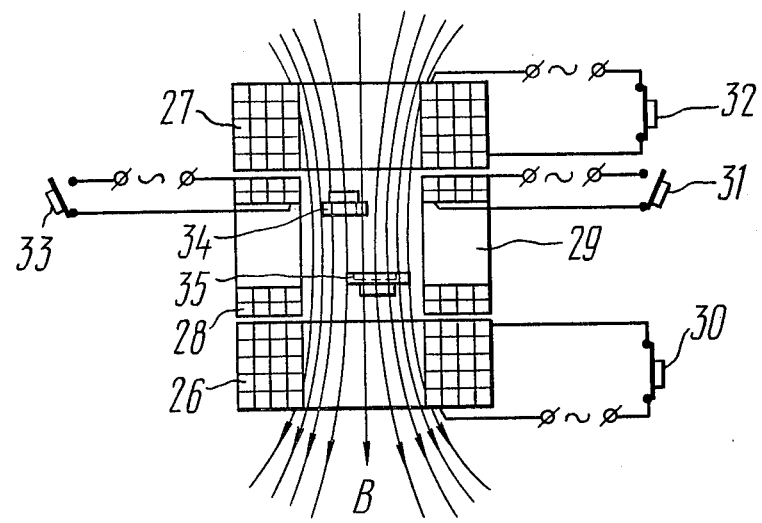
FIG. 15 is an embodiment of the device for assembly of complex-shaped components.
Figure 16:
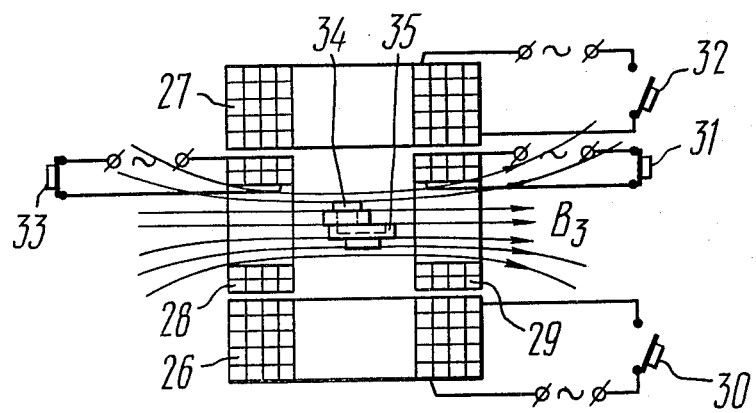
FIG. 16 is the same device at another stage of operation.

FIGS. 15 and 16 illustrate various operating steps of the device for carrying the proposed method of assembly into effect.

The device comprises four solenoid coils 26, 27, 28 and 29 connected to an a-c source (not shown) through automatically controlled switches 30, 31, 32, 33. The coils 26 and 27 produce a primary magnetic field B (FIG. 15). The coils 28 and 29 produce an additional magnetic field $B_3$ (FIG. 16). The space between the coils 26, 27, 28 and 29 is selected taking into account the assembly conditions (overall dimensions of the components, their initial position, etc.).

FIGS. 15 and 16 also show components 34 and 35 located in the assembly zone.

The device operates as follows. The components 34 and 35 to be assembled are delivered into the space between the coils 26, 27 in the assembly zone. As shown in FIG. 15, the components 34 and 35 can be supplied simultaneously through the openings of the coils 26 and coil 27 or through the openings of the coils 28 and 29. During this time all switches 30-33 are open. After delivering the components 34, 35 to the assembly zone, the coils 26 and 27 are connected to the current source by operating the switches 30, 32, as shown in FIG. 15. The first cycle of the assembly (motion of the components 34, 35 to the assembly axis 4 and their motion towards each other) is effected under the action of the primary magnetic field B. After a time interval $t_1$, the switches 30 and 32 are automatically opened and the switches 31 and 33 are closed, as shown in FIG. 16. In this case, the components 34 and 35 are acted on by the additional magnetic field $B_3$. After a time interval $t_2$, the coils 28 and 29 are deenergized and the coils 26 and 27 are energized in accordance with the graph (FIG. 14), etc., until the cycle of assembly is completed.

The assembled unit is removed from the working zone through one of the openings of the coils 26–29. Such devices cause no difficulties in supply and removal of the components through the use of well known means for automatic loading.

It is also evident that such magnetic systems can conveniently be arranged in the mechanisms of automatic assembly lines. The process of assembly can be effected both when one of the components being assembled is connected to a rigid base or a supply device element and without rigid connection of the components. For simplicity, the essence of the proposed method was illustrated by way of example of assembly of a unit of two components to be joined. The same effect of mutual arrangement can be obtained for two and more components.

The process of assembly is most efficient when the cross section of the primary magnetic field has a configuration similar to the maximum section of the unit assembled of in a plane perpendicular to the assembly axis. At the beginning of the process of assembly, the cross-sectional area of the magnetic field must exceed the area of the maximum section of the unit to such an extent that this field covers all the components within the assembly zone; then, as the components are becoming coincident, the cross section of the primary magnetic field should be reduced until it coincides with the section of the assembled components at the joining section in a plane perpendicular to the axis of assembly.

Thus we can effect assembly of base components having several joining surfaces, with several components of different configuration. For this purpose, a local primary alternating magnetic field is applied along each axis of assembly of the base component, the configuration of this field being similar to the section of the base joining element. At the beginning of the process, the section of the local magnetic field in the direction perpendicular to the axis of assembly is selected so that this field covers both the contour of joining of the base component and the remaining components to be assembled along the given axis; then, as the joining contours are being made congruent, the magnetic flux area is narrowed until it coincides with the contour of joining the base component. In this case, the local magnetic fields are applied either simultaneously on all axes of assembly or successively on each axis, a group of axes being spaced one from another to eliminate mutual interference.

Figure 17:
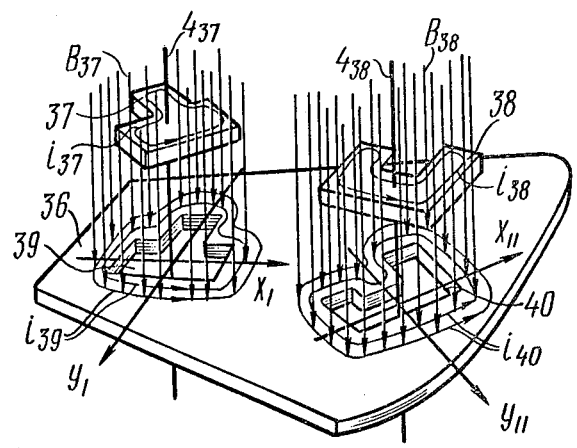
FIG. 17 is an isometric view of the base component with two other components.

Let us consider in detail the essence of the proposed version of the method of assembly on an example of joining a base component 36 (FIG. 17) to components 37 and 38 provided that the component 37 is to be assembled with the component 36 along the joining surface of a socket 39 (assembly axis $4_{37}$). Correspondingly, a component 38 must be applied accurately and joined with a socket 40 (assembly axis $4_{38}$). FIG. 17 shows that local primary magnetic fields $B_{37}$ and $B_{38}$ are applied along the axes $4_{37}$ and $4_{38}$, the configuration of the cross sections of these fields being similar to those of the sockets 39 and 40.

With such an action of the magnetic fields $B_{37}$ and $B_{38}$ we obtain sufficiently accurate distribution of the contours of the induced currents $i_{39}$ and $i_{40}$ over the perimeter of the joining surfaces of the base component 36, namely: the currents $i_{39}$ are induced along the perimeter of the socket 39 and the currents $i_{40}$ are induced along the perimeter of the socket 40. At the same time, currents $i_{37}$ and $i_{38}$ are induced in the joined components 37 and 38 respectively. Further process of assembly is effected as described above, namely: the interaction of the contours of the currents $i_{37}$ and $i_{39}$ provides mutual location, approach and joining of the component 37 with the socket 39 and the assembly of the component 38 with the socket 40 is effected due to the action of the contours of the currents $i_{38}$ and $i_{40}$.

Figure 18:
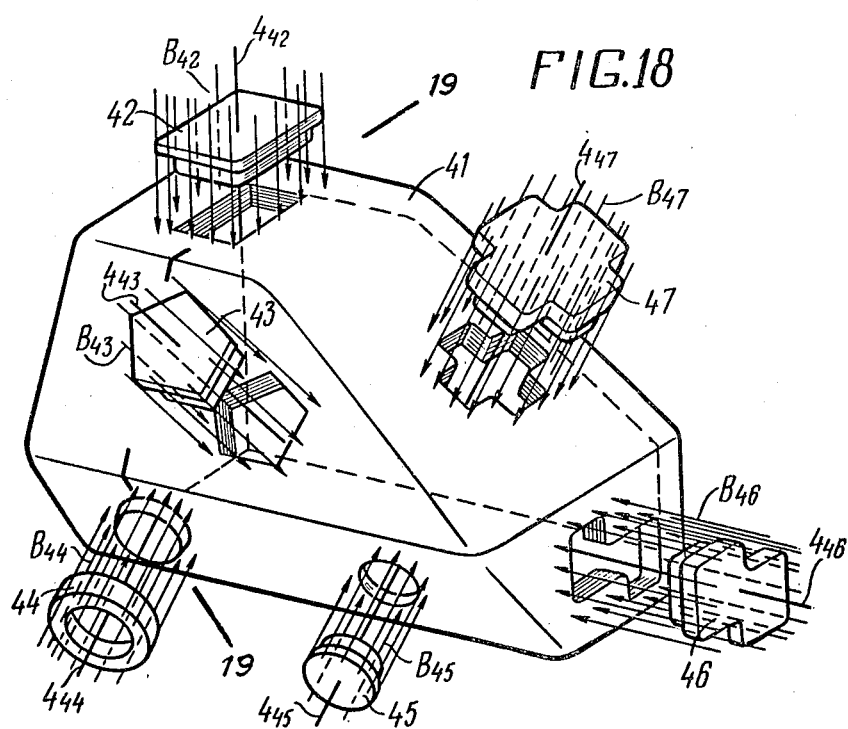
FIG. 18 is an isometric view of the casing component with six other components.

FIG. 18 illustrates an example of simultaneous assembly of a casing component 41 with components 42, 43, 44, 45, 46, 47 which must be accurately installed and coupled with the coresponding joinable elements of a base component 41 along the six assembly axes $4_{42}$, $4_{43}$, $4_{44}$, $4_{45}$, $4_{46}$, $4_{47}$. Such assembly is effected by arranging the assembly axes $4_{42}$–$4_{47}$ local magnetic fields $B_{42}$, $B_{43}$, $B_{44}$, $B_{45}$, $B_{46}$, $B_{47}$ by analogy with the operation described above and shown in FIG. 17. When the assembly axes do not coincide with the vertical direction, e.g. $4_{43}$–$4_{47}$ in FIG. 18, the components should be maintained in a required initial position by mechanical means such as trays, clamps, supports, etc. until the local magnetic field is switched on. With good electrical conductivity of the material of the assembled components (aluminum, copper, etc.) the electrodynamic forces exceed the gravitational forces and, therefore, the process of assembly can be effected without additional mechanical means.

The local magnetic fields $B_{42}$–$B_{47}$ are preferably provided by means of C-shaped electric magnets.

The layout of the assembly device should be based on the condition of convenient supply of the component to the assembly zone and easy removal of the assembled unit. This can be easily provided if the magnetic circuits of the electric magnets have movable linkings.

The induction of the local magnetic field is selected taking into account the required effort for the assembly, which depends on the joining perimeter, viscosity of the material of the components, the type of fit, etc., as mentioned above.

The frequency of each local magnetic field is selected taking into account the overall dimensions, material and shape of the components to be assembled. To simplify a power supply source, all electric magnets of the assembly device may be connected to a current source providing the same field frequency. In this case, the higher frequency should be chosen.

Taking into account that the error in the supply of the components to the assembly zone can be relatively large, it is expedient that at the beginning of the process of assembly the cross-sectional area of the local alternating magnetic field in the direction perpendicular to the assembly axis covers both the contour of the base components and other components to be assembled along the predetermined axis. This eliminates arbitrary motion of the component from the assembly zone. As the component is moved to the common assembly axis, the area of the local magnetic field is narrowed to the cross-sectional area of the base component to be joined. This can be provided by different known devices including those shown in FIGS. 19 and 20 in different operating stages.

Figure 19:
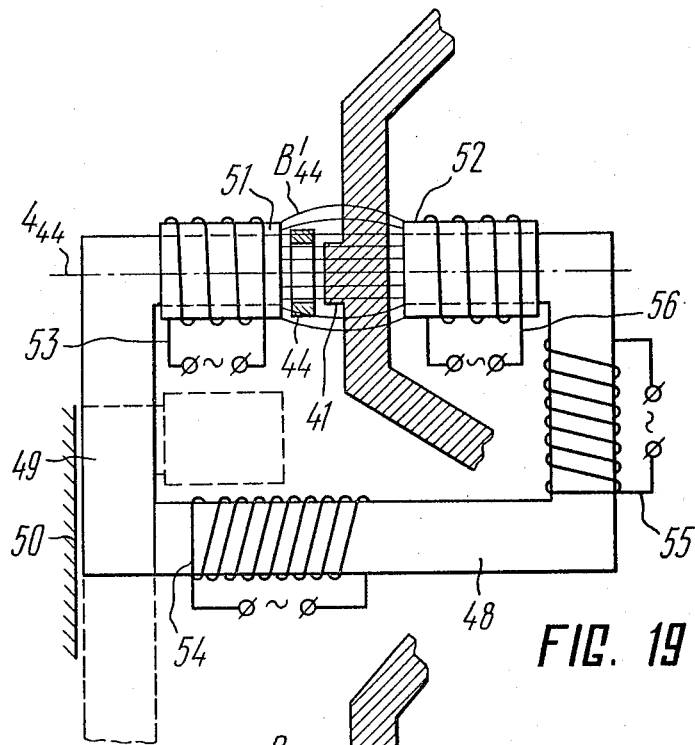
FIG. 19 is an embodiment of the device for assembly of complex-shaped components and a casing component.
Figure 20:
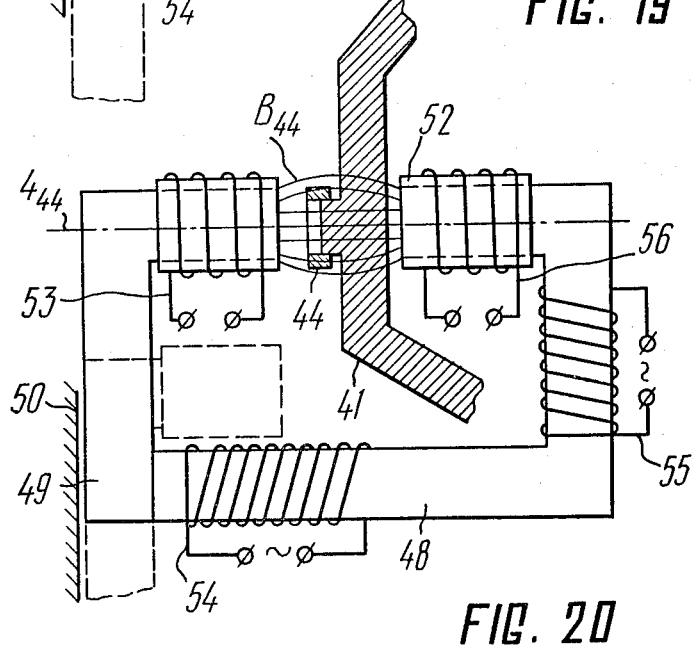
FIG. 20 is the same at another stage of operation.
Figure 21:
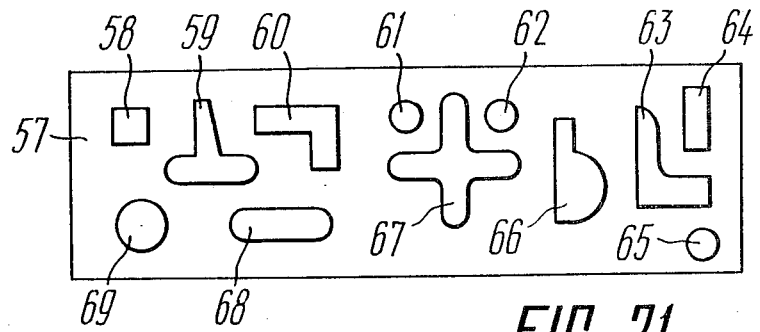
FIGS. 21, 22, 23, 24 show diagrams of successive application of the local magnetic fields in the presence of a plurality of components to be joined in a base component.

The device includes a C-shaped electric magnet consisting of magnetic circuits 48 and 49. The magnetic circuit 49 is capable of moving with respect to the magnetic circuit 48 along a guide 50. This is made to provide a possibility of arrangement of components having a complex configuration between the pole pieces of the electric magnet. As an example of such a component FIGS. 19, 20 illustrate a sectional view through a line 19—19 of the component 41 shown in FIG. 18. In order to place the component 41 in the interpole space of the electric magnet, the magnetic circuit 49 is shifted to the position shown in FIGS. 19, 20 by a dashed line. The component 41 is oriented approximately along the axis of assembly, e.g. axis 4₄₄; and the magnetic circuit 49 is then returned to its initial position.

Placed on the pole pieces of the electric magnet are sleeves 51, 52 made of a ferromagnetic material having lower magnetic permeability than the remaining part of the magnetic circuit 49 and 50. The magnetic circuit 49, 50 carries a magnetizing winding consisting of coils 53, 54, 55 and 56. The coils 54, 55 are connected to an a-c current source (not shown) during the whole process of assembly. The coils 53, 56 are connected to this source for a time period required for producing a magnetic field $B_{44}'$ having a larger cross-sectional area (FIG. 19). The magnetic field $B_{44}$ of a lower cross-sectional area is provided by deenergizing the coils 53 and 56 as shown in FIG. 20.

The cross-sectional area of the magnetic flux in the assembly zone can be changed in a different way, e.g. by supplying d-c current to the coils 53 and 56.

Figure 22:
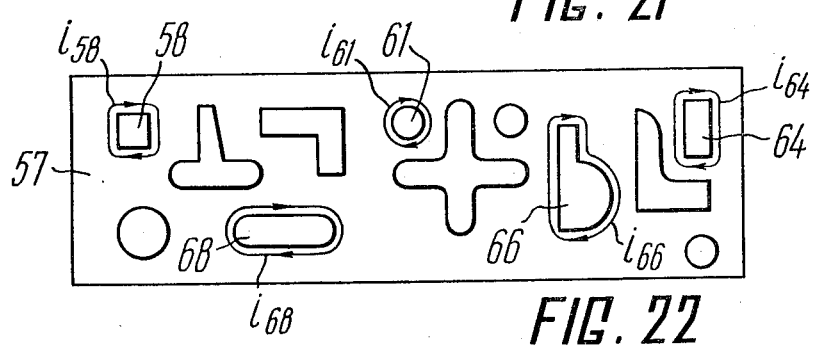

When the joinable elements of the base component are relatively close to each other, the local magnetic fields are preferably applied alternately along each axis or a group of axes separated by a distance excluding interference during the assembly. Thus, for example, the base component 57 (FIGS. 21, 22, 23 and 24) is provided with sockets 58, 59, 60, 61, 62, 63, 64, 65, 66, 67, 68, 69, which are necessary for assembly of components (not shown). In this case, such a component is preferably acted on by local magnetic fields directed along the axes of assembly of the sockets 58, 61, 64, 66 and 68 (FIG. 22); in so doing, the following currents are induced: $i_{58}$, $i_{61}$, $i_{64}$, $i_{66}$ and $i_{68}$.

Figure 23:
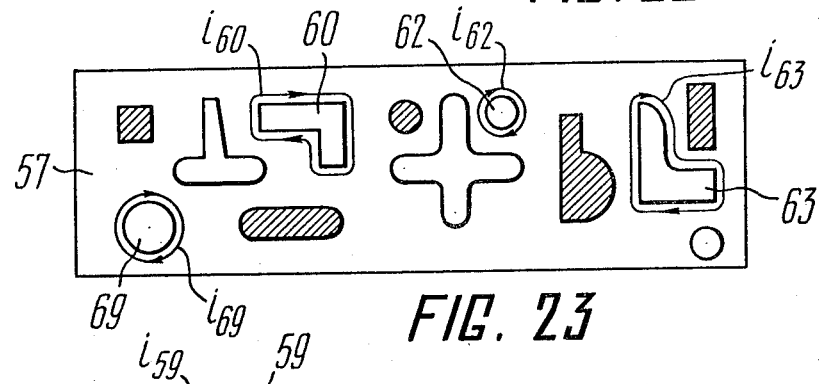
Figure 24:
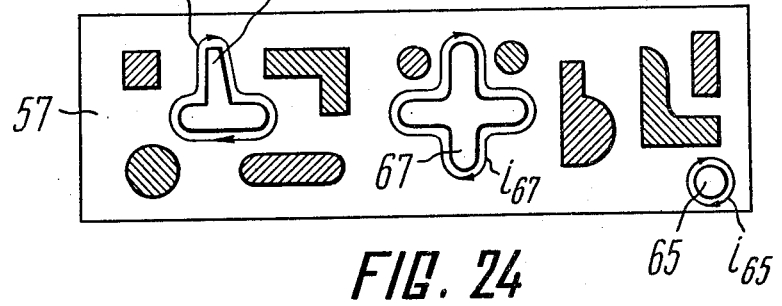

During the next stage of assembly the local magnetic fields are directed to act along the axes of assembly for the sockets 60, 62, 63 and 69 and 69 (FIG. 23). Currents $i_{60}$, $i_{62}$, $i_{63}$ and $i_{69}$ are induced along the perimeter of these sockets.

At the third stage of assembly, the local magnetic fields are directed along the axes of assembly of the sockets 59, 65 and 67 thus providing induction of currents $i_{59}$, $i_{65}$ and $i_{67}$ (FIG. 24) along the perimeter of the remaining sockets. The succession of action of the local fields may be different. The articles assembled by means of the proposed method may have different sizes from components of watch mechanisms to motorcar units.

In some cases, when the components being assembled into a unit are made in the form of rings, sleeves, rollers, toothed gears, etc., the process of assembly is effected on a mandrel.

Figure 25:
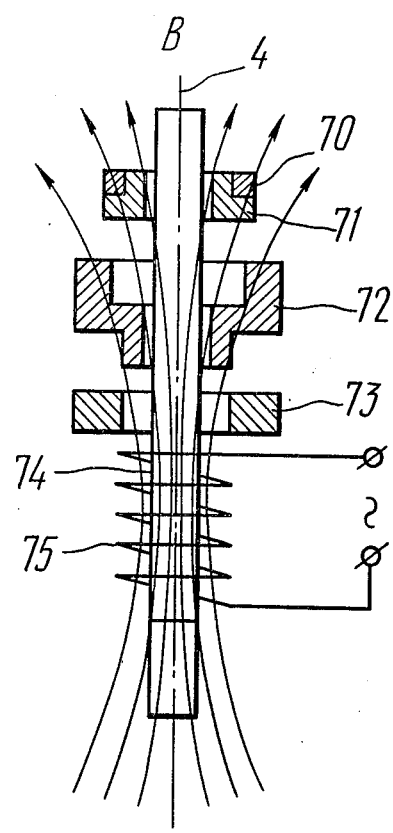
FIG. 25 is a schematic diagram of the device for assembly of components on a mandrel.

When assembling the components 70, 71, 72 and 73 shown in FIG. 25 by the proposed method, the density of the primary magnetic field B is concentrated along the assembly axis 4. Placed in this field is a mandrel 74 of a ferromagnetic material (ferrite or electrotechnical steel) playing a role of a magnetic circuit and a magnetizing winding 75 is placed at one end of the mandrel. After connecting the magnetizing winding 75 to an a-c current source (not shown), the components 70–73 are fed to the assembly zone. The magnetic field is preferably concentrated along the mandrel axis to save electric energy for producing the magnetic field. The assembled unit can be removed from the mandrel 74 by means of a pulse increase of the induction of the magnetic field B. This version of the method of assembly can be carried into effect through another device, e.g. a C-shaped magnet whose interpole space is saturated with a magnetic field according to FIGS. 9, 11. Such devices are conveniently combined with known means for supplying components and removing ready articles.

What is claimed is:

1. A method of assembling nonmagnetic current-conducting components into units along an axis of assembly comprising the steps of producing a primary alternating magnetic field whose induction vector is directed along said axis of assembly; placing the components to be assembled in said primary magnetic field to induce in said components currents exciting a secondary magnetic fields interacting with said primary magnetic field thus producing electrodynamic forces acting on the components placed in said primary magnetic field, said components being placed so that the areas of said components covered by the contours of said induced currents are located in planes approximately perpendicular to said axis of assembly and at least partially overlap each other in each adjacent pair of the components to be assembled.

2. A method of assembly as claimed in claim 1, wherein the cross section of said primary magnetic field has a configuration similar to and somewhat larger than the maximum section of the unit assembled of said components in a plane perpendicular to the axis of assembly.

3. A method of assembly as claimed in claim 1, wherein the frequency of oscillations of said primary magnetic field is selected by one of the components to be assembled, which has the maximum optimal calculated value of generalized frequency determined from the current conductivity of a component material, magnetic permeability of vacuum, and a typical size of the component at a specified value of induction of said field.

4. A method of assembling nonmagnetic current-conducting components into units along an axis of assembly comprising the steps of producing a primary magnetic field whose induction vector is directed along said axis of assembly; placing said components to be assembled in said primary magnetic field producing in said components contour currents exciting secondary magnetic fields interacting with said primary magnetic field and thus producing electrodynamic forces acting on the components placed in said primary magnetic field, said components being placed in said field so that the areas of said components covered by said induced contour currents are located in planes approximately perpendicular to said axis of assembly and at least partially overlap each other in each adjacent pair of said components.

5. A method of assembly as claimed in claim 4, wherein components of the "sleeve-shaft" type are assembled, said "sleeve" component being first placed in said primary magnetic field and being kept therein until it reaches a temperature at which its inner diameter increases, said "shaft" component being then placed in said field.

6. A method of assembly as claimed in claim 4, wherein said units are assembled of at least three components, where the intermediate component is a brazing solder, said method comprising a step of heating said components by said primary magnetic field to the melting point of said solder.

7. A method of assembly as claimed in claim 6, wherein said heating is affected by keeping said components in said primary magnetic field to the temperature of solder melting.

8. A method as claimed in claim 4, wherein, prior to placing said components in said primary alternating magnetic field, placed therein along said axis of assembly is a mandrel of a ferromagnetic material, functioning as a magnetic circuit, whereas, for the purpose of saving energy required for the production of a magnetic field, said primary magnetic field is made non-uniform in density with the maximum value of concentrated density on said axis of assembly.

9. A method of assembling nonmagnetic current-conducting components into units along an axis of assembly comprising the steps of producing a primary alternating magnetic field whose induction vector is directed along said axis of assembly; placing the components to be assembled in said primary magnetic field to induce in said components currents exciting secondary magnetic fields interacting with said primary magnetic field thus producing electrodynamic forces acting on the components placed in said primary magnetic field, said components being placed so that the areas of said components covered by the contours of said induced currents are located in planes approximately perpendicular to said axis of assembly and at least partially overlap each other in each adjacent pair of the components to be assembled, said primary magnetic field being pulsed and during the pauses of this field the assembly zone being acted on by an additional alternating pulsating magnetic field, the induction vector of said additional magnetic field being directed at an angle to the induction vector of said primary magnetic field, and the duration of the pulses of said additional magnetic field being equal to the duration of the pauses of said primary magnetic field.

10. A method of assembly as claimed in claim 9, wherein said angle between the induction vectors of the primary and additional said magnetic fields is equal to 90°.

11. A method of assembly as claimed in claim 9, wherein the duration of the pulses of said primary and additional magnetic fields is gradually reduced from the beginning of the process of assembly to its end while simultaneously increasing the amplitude of the pulses of said primary magnetic field.

12. A method of assembly as claimed in claim 9, wherein the cross section of said primary magnetic field has a configuration similar to and somewhat larger than the maximum section of the unit assembled of said components in a plane perpendicular to said axis of assembly.

13. A method of assembly as claimed in claim 12, wherein the cross section of said primary magnetic field is narrowed as said components are being joined until the cross section of said primary magnetic field coincides with the section of said components at the joining region in a plane perpendicular to said axis of assembly.

14. A method of assembling nonmagnetic current-conducting components into units along an axis of assembly comprising the steps of producing a primary alternating magnetic field whose induction vector is directed along said axis of assembly; placing the components to be assembled in said primary magnetic field to induce in said components currents exciting secondary magnetic fields interacting with said primary magnetic field thus producing electrodynamic forces acting on the components placed in said primary magnetic field, said components being placed so that the areas of said components covered by the contours of said induced currents are located in planes approximately perpendicular to said axis of assembly and at least partially overlap each other in each adjacent pair of the components to be assembled, the cross-section of said primary magnetic field being a configuration similar to and somewhat larger than the maximum section of the unit assembled of said components in a plane perpendicular to the axis of assembly, and the cross-section of said primary magnetic field being narrowed as said components are being joined until the cross-section of said primary magnetic field coincides with the section of said components at the joining region in a plane perpendicular to said axis of assembly.

15. A method of assembling nonmagnetic current-conducting components into units along an axis of assembly comprising the steps of producing a primary alternating magnetic field whose induction vector is directed along said axis of assembly; placing the components to be assembled in said primary magnetic field to induce in said components currents exciting secondary magnetic fields interacting with said primary magnetic field thus producing electrodynamic forces acting on the components placed in said primary magnetic field, said components being placed so that the areas of said components covered by the contours of said induced currents are located in planes approximately perpendicular to said axis of assembly and at least partially overlap each other in each adjacent pair of the components to be assembled, said primary alternating magnetic field being of non-uniform density increasing from said axis of assembly to the periphery of the zone of assembly.

16. A method of assembling nonmagnetic current-conducting components into units along an axis of assembly comprising the steps of producing a primary alternating magnetic field whose induction vector is directed along said axis of assembly; placing the components to be assembled in said primary magnetic field to induce in said components currents exciting secondary magnetic fields interacting with said primary magnetic field thus producing electrodynamic forces acting on the components placed in said primary magnetic field, said components being placed so that the areas of said components covered by the contours of said induced currents are located in planes approximately perpendicular to said axis of assembly and at least partially overlap each other in each adjacent pair of the components to be assembled, the frequency of oscillations of said primary magnetic field being selected by one of the components to be assembled, which has the maximum optimal calculated value of generalized frequency determined from the current conductivity of a component material, magnetic permeability of vacuum, and a typical size of the component at a specified value of induction of said field, the frequency of oscillations of said primary magnetic field being gradually increased to 30–50% of the selected value as said components approach one another to the moment of their contact after which said frequency is lowered to said selected value.

17. A method of assembling nonmagnetic current-conducting components into units along an axis of assembly comprising the steps of producing a primary alternating magnetic field whose induction vector is directed along said axis of assembly; placing the components to be assembled in said primary magnetic field to induce in said components currents exciting secondary magnetic fields interacting with said primary magnetic field thus producing electrodynamic forces acting on the components placed in said primary magnetic field, said components being placed so that the areas of said components covered by the contours of said induced currents are located in planes approximately perpendicular to said axis of assembly and at least partially overlap each other in each adjacent pair of the components to be assembled and wherein at the moment of contact of said components over the joined surfaces the induction of said primary magnetic field is shortly increased at least twice its initial value.

18. A method of assembling non-magnetic current-conducting components into units along an axis of assembly comprising the steps of producing a primary magnetic field whose induction vector is directed along said axis of assembly; placing said components to be assembled in said primary magnetic field producing in said components contour currents exciting secondary magnetic fields interacting with said primary magnetic field and thus producing electrodynamic forces acting on the components placed in said primary magnetic field, said components being placed in said field so that the areas of said components covered by said induced contour currents are located in planes approximately perpendicular to said axis of assembly and at least partially overlap each other in each adjacent pair of said components said units being assembled of at least three components, where the intermediate component is a brazing solder, said method comprising a step of heating said components by said primary magnetic field to the melting point of said solder and wherein said heating is effected by raising the frequency of oscillations of said primary magnetic field.

* * * * *